(12) United States Patent
Kim et al.

(10) Patent No.: US 8,991,907 B1
(45) Date of Patent: Mar. 31, 2015

(54) FRONT VEHICLE BODY REINFORCING STRUCTURE

(71) Applicants: Hyundai Motor Company, Seoul (KR); Kia Motors Corporation, Seoul (KR)

(72) Inventors: Kyeong Jae Kim, Hwaseong-si (KR); Ildo Kim, Suwon-si (KR); Yun Chang Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/290,745

(22) Filed: May 29, 2014

(30) Foreign Application Priority Data

Dec. 5, 2013 (KR) ........................ 10-2013-0150693

(51) Int. Cl.
*B62D 25/08* (2006.01)

(52) U.S. Cl.
CPC ...................................... *B62D 25/08* (2013.01)
USPC .................. 296/193.09; 296/198; 296/203.02

(58) Field of Classification Search
USPC .................... 296/187.09, 187.1, 193.09, 198, 296/203.02, 204
See application file for complete search history.

(56) References Cited

U.S. PATENT DOCUMENTS

| 2006/0284449 | A1* | 12/2006 | Miyahara ...................... 296/204 |
| 2007/0176443 | A1* | 8/2007 | Yasuhara et al. .............. 293/133 |
| 2009/0140546 | A1* | 6/2009 | Okabe et al. ............. 296/187.09 |
| 2010/0259033 | A1* | 10/2010 | Okabe et al. ................... 280/734 |
| 2013/0241233 | A1* | 9/2013 | Ohnaka et al. ............. 296/187.1 |
| 2013/0320710 | A1* | 12/2013 | Watanabe ................ 296/187.09 |
| 2014/0265451 | A1* | 9/2014 | Jones et al. ............. 296/193.09 |

FOREIGN PATENT DOCUMENTS

| JP | 2001-278116 | A | | 10/2001 |
| JP | 2003-246280 | A | | 9/2003 |
| KR | 10-0471494 | B1 | | 2/2005 |
| KR | 10-2010-0023534 | A | | 3/2010 |
| KR | 1020100023534 | A | * | 4/2010 |
| KR | 10-2010-0058165 | A | | 6/2010 |

* cited by examiner

*Primary Examiner* — Jason S Morrow
(74) *Attorney, Agent, or Firm* — Morgan, Lewis & Bockius LLP

(57) ABSTRACT

A front vehicle body reinforcing structure may include front side members and front fender apron members. The front side members are formed to be extended in a length direction of a vehicle, are disposed at both left and right sides in a width direction of the vehicle, respectively, and each includes a front tip portion that is positioned at a front side in the length direction of the vehicle. Each of the front fender apron members is provided with a front tip portion that is formed to match the front tip portion of a respective front side member in the length direction of the vehicle to be coupled to the front tip portion of the respective front side member, and formed to be extended in the length direction of the vehicle. The structure effectively reduces impact of a frontal collision accident by increasing structural rigidity of the front vehicle body.

11 Claims, 3 Drawing Sheets

FRONT VEHICLE BODY REINFORCING STRUCTURE

CROSS-REFERENCE TO RELATED APPLICATION

The present application claims priority of Korean Patent Application Number 10-2013-0150693 filed on Dec. 5, 2013, the entire contents of which application are incorporated herein for all purposes by this reference.

BACKGROUND OF INVENTION

1. Field of Invention

The present invention relates to a front vehicle body reinforcing structure which reinforces structural rigidity of a front vehicle body of a vehicle, by forming a front tip portion of a fender apron member, which constitutes the front vehicle body of the vehicle, in a length direction of the vehicle, so that the front tip portion of the fender apron member is extended up to a front tip portion of a front side member in the length direction of the vehicle, by allowing the front tip portion of the fender apron member to be coupled to the front tip portion of the front side member so that multiple surfaces of the front tip portions of the fender apron member and the front side member are coupled to each other, and by allowing a front tip portion of a sub frame in the length direction of the vehicle to be directly fastened to the front tip portion of the fender apron member.

2. Description of Related Art

In general, a front vehicle body of a vehicle is a structure that is positioned at a front side in the length direction of the vehicle, and forms an engine room, and includes a front end module which forms a front side of the engine room and on which a cooling module, a head lamp, and the like are mounted, front fender apron members which form both left and right portions of the engine room, and provide a space in which a suspension system and wheels are installed, a dash panel which is positioned at a rear side of the engine room and partitions a passenger room and the engine room, and the like.

In addition, front side members, which are formed to be extended in the length direction of the vehicle, are disposed at both left and right sides at a lower portion of the engine room so as to reinforce structural rigidity of the front vehicle body, and a sub frame is disposed at a lower portion of the front side members in order to mount and support the suspension system and the like as well as an engine and a transmission that are installed in the engine room.

The front fender apron member has one end that is placed on and connected to an upper portion of the front side member at a predetermined position in a length direction, and the other end that is connected to a front pillar.

A bumper beam, which is formed to be extended in a width direction of the vehicle, is mounted on a front tip portion of the front side member in order to improve performance for coping with a collision of the vehicle.

In a case in which the vehicle, which is provided with the front vehicle body having the aforementioned structure, undergoes a frontal collision with an obstacle or other vehicles when the vehicle travels, the bumper beam first absorbs impact energy while being deformed by receiving impact, the impact energy is also transferred to the front side member through the bumper beam such that the front side member also absorbs impact energy while being deformed by receiving impact, and the impact energy, which is not absorbed by the front side member, is distributed to and absorbed by other parts in a vehicle body such as the front fender apron member, the front pillar, and the like that are connected with the front side member.

However, the front vehicle body in the related art has a connection structure in which the front tip portion of the front fender apron member is simply placed on and coupled to an upper portion of the front side member at a predetermined position in a length direction, and thus connectivity between the front side member and the front fender apron member is weak.

For this reason, there are problems in that impact energy transferred to the front side member cannot be properly dispersed to the front fender apron member and other parts in the vehicle body, and the front side member mainly and solely absorbs impact energy such that the front side member is excessively deformed and damaged.

In addition, a rear tip portion of the front side member in the length direction of the vehicle is connected to the dash panel that separates the engine room and the passenger room, and as a result, there are problems in that impact energy is excessively transferred to the dash panel through the front side member, and thereby, the dash panel is excessively deformed toward the passenger room by receiving impact energy, which threatens safety of an occupant in the passenger room.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a front vehicle body reinforcing structure which reinforces connectivity between a front fender apron member and a front side member, improves performance for distributing impact energy, and improves performance for coping with a frontal collision of a vehicle, thereby more safely protecting an occupant at the time of a frontal collision accident of the vehicle, and allows a sub frame and a fender apron upper to be directly fastened to each other, and allows an external load, which is inputted through a sub frame when the vehicle travels, to be effectively dispersed to various portions in a vehicle body through the front fender apron member, thereby improving ride comfort of the vehicle.

Various aspects of the present invention provide a front vehicle body reinforcing structure including front side members which are formed to be extended in a length direction of a vehicle, are disposed at both left and right sides in a width direction of the vehicle, respectively, and each includes a front tip portion that is positioned at a front side in the length direction of the vehicle; and front fender apron members each of which is provided with a front tip portion that is aligned with the front tip portion of a respective front side member in the length direction of the vehicle to be coupled to the front tip portion of the respective front side member, and formed to be extended in the length direction of the vehicle.

The front tip portion of the respective front side member may be positioned above the front tip portion of the corresponding front fender apron member in a height direction of the vehicle. A cross-sectional area of the front tip portion of the respective front side member may be smaller than a cross-sectional area of the front tip portion of the corresponding front fender apron member.

The front vehicle body reinforcing structure may further include a sub frame which mounts and supports a suspension system, and has a front tip portion that is positioned at the front side in the length direction of the vehicle, wherein the front tip portion of the corresponding front fender apron member includes an enlarged portion that is enlarged downward in the height direction of the vehicle to be directly fastened to the front tip portion of the sub frame. The front tip portion and the enlarged portion of the corresponding front fender apron member may be formed to have a cross section having a quadrangular box shape.

The front tip portion of the front fender apron member may be provided with an enlarged flange or flanges to be coupled to the front tip portion of the respective front side member in a state in which the front tip portion of the corresponding front fender apron member is in surface contact with at least three surfaces of the front tip portion of the respective front side member.

The front tip portion of the respective front side member may be formed in a quadrangular box shape that is provided with an upper surface and a lower surface in the height direction of the vehicle, and an outer surface and an inner surface in the width direction of the vehicle, and the flange or flanges of the front tip portion of the corresponding front fender apron member may be coupled to the outer surface, the inner surface, and the upper surface of the front tip portion of the respective front side member, respectively.

The front vehicle body reinforcing structure may further include a dash panel which separates an engine room and a passenger room, wherein one or each of the front side members includes an enlarged portion that is positioned at a rear side in the length direction of the vehicle, and enlarged outward in the width direction of the vehicle to be coupled to the dash panel.

One or each of the front fender apron members may further include a rear tip portion that is formed to be positioned at a rear side in the length direction of the vehicle, and coupled to a front pillar. The rear tip portion of the one or each of the front fender apron members may be formed to be disposed above the front tip portion of the one or each of the front fender apron members in the height direction of the vehicle.

According to the front vehicle body reinforcing structure of the present invention, the front tip portion of the front fender apron member in the length direction of the vehicle is formed to be extended up to the front tip portion of the front side member in the length direction of the vehicle, and the front tip portion of the front fender apron member is securely coupled to the front tip portion of the front side member, such that impact energy is simultaneously distributed and transferred to the front side member and the front fender apron member at the time of a frontal collision accident of the vehicle, and performance for absorbing and dispersing impact energy caused by a collision accident of the vehicle is improved, thereby more safely protecting an occupant, and effectively reducing excessive damage to the vehicle body.

In addition, since the front tip portion of the sub frame in the length direction of the vehicle may be directly fastened to the front tip portion of the front fender apron member, the front fender apron member receives external impact and load, which are transferred to the vehicle body from wheels through the suspension system and the sub frame sequentially when the vehicle travels, and effectively transmits and disperses the external impact and load to other parts in the vehicle body through the front side member and the like, thereby improving ride comfort, driving stability, and the like of the vehicle.

Moreover, the front tip portion of the sub frame may be directly fastened to the front tip portion of the front fender apron member without interposing a separate mounting bracket or the like, thereby reducing the number of components and a weight of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
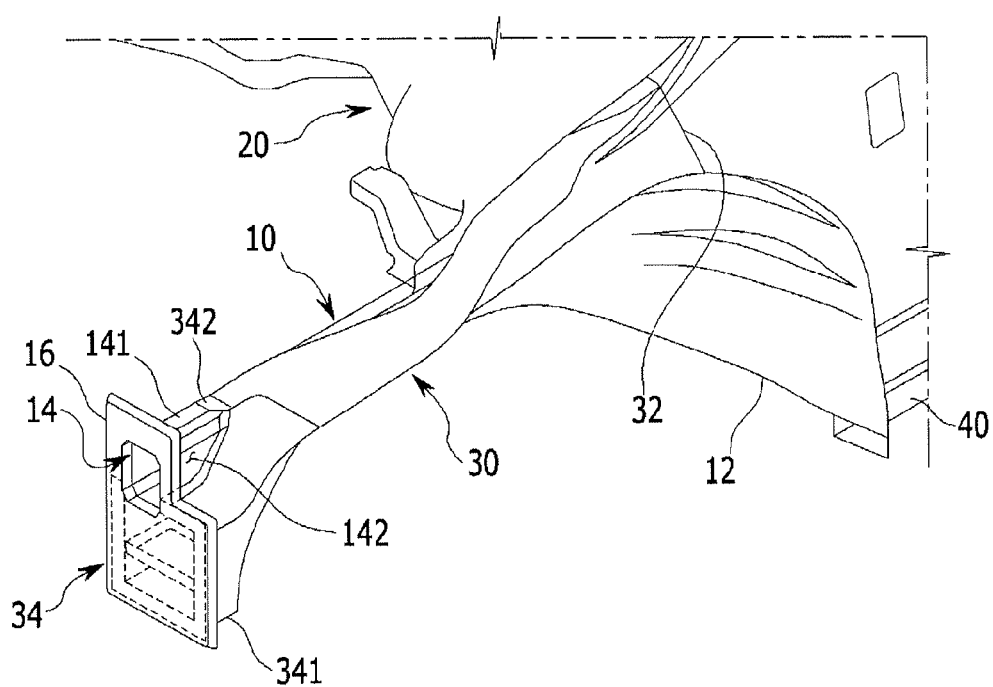
FIG. 1 is a perspective view of an exemplary front vehicle body reinforcing structure according to the present invention.
Figure 2:
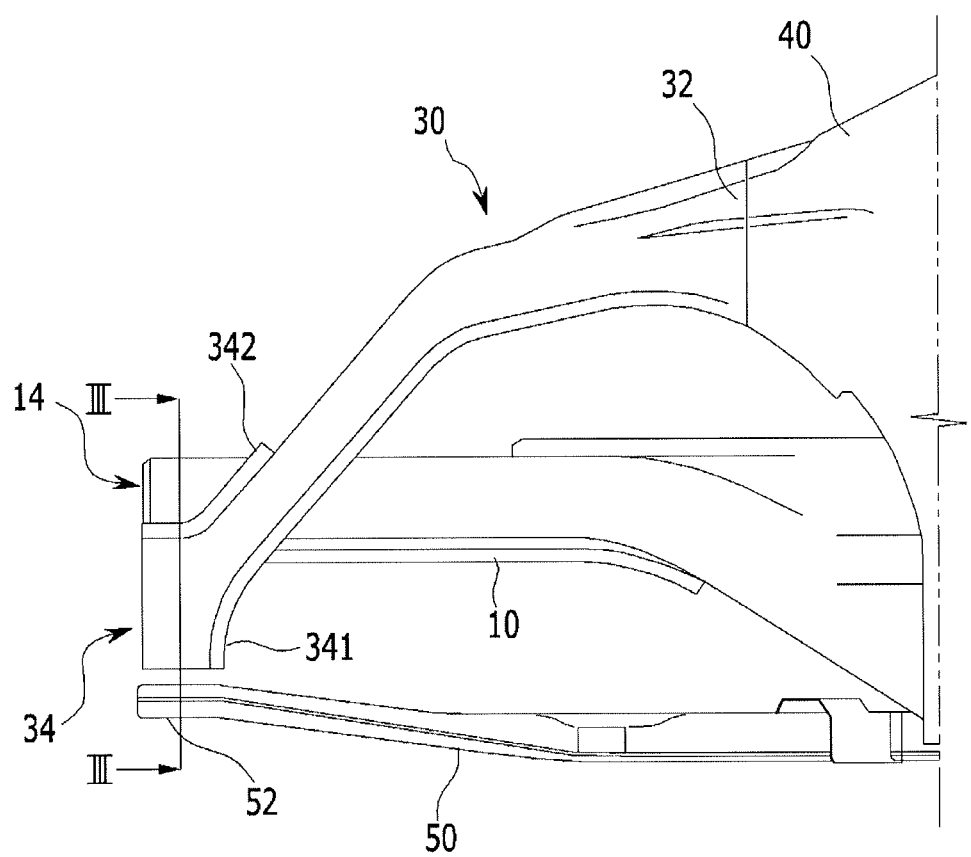
FIG. 2 is a side view of an exemplary front vehicle body reinforcing structure according to the present invention.

Referring to FIGS. 1 and 2, a front vehicle body reinforcing structure for a vehicle according to the present invention may include front side members 10 that are formed to be extended in a length direction of the vehicle. The front side members 10 may be disposed at left and right sides in a width direction of the vehicle, respectively.

The front side member 10 is formed to have a cross section having approximately a hollow quadrangular box shape, but may be formed to have a polygonal cross section instead of the quadrangular cross section. The cross section having the quadrangular box shape may be formed to be extended in a length direction of the front side member 10.

The front side member 10 may include an enlarged portion 12 that is formed to be enlarged in the width direction of the vehicle at a rear side in the length direction of the vehicle. The enlarged portion 12 may be coupled to a dash panel 20 that separates an engine room and a passenger room.

The front side member 10 may include a front tip portion 14 that is positioned at a front side in the length direction of the vehicle. The front tip portion 14 of the front side member 10 may include a cross section having a quadrangular box shape, and an opening portion.

A mounting bracket 16 for mounting a crash box may be attached to the front tip portion 14 of the front side member 10.

A front fender apron member 30 may be disposed outward from the front side member 10 in the width direction of the vehicle. The front fender apron member 30 is positioned to be higher than the front side member 10 in a height direction of the vehicle, and may include a rear tip portion 32 that is positioned at the rear side of the length direction of the vehicle, and a front tip portion 34 that is positioned at the front side in the length direction of the vehicle.

The rear tip portion 32 of the front fender apron member 30 may be integrally coupled to a front pillar 40 to which a front door of a vehicle is rotatably mounted.

The front tip portion 34 of the front fender apron member 30 may be positioned to be lower than the rear tip portion 32 of the front fender apron member 30 in the height direction of the vehicle, and may be formed to be positioned at the front side in the length direction of the vehicle. The front tip portion 34 of the front fender apron member 30 may be aligned with the front tip portion 14 of the front side member 10 in the length direction of the vehicle.

The mounting bracket 16 for mounting the crash box may also be attached to the front tip portion 34 of the front fender apron member 30.

Accordingly, at the time of a collision accident of the vehicle, impact energy is simultaneously transferred to the front tip portion 14 of the front side member 10 and the front tip portion 34 of the front fender apron member 30 through a non-illustrated bumper beam and the crash box, thereby improving performance for distributing impact energy, and impact energy dispersion effect.

The front tip portion 34 of the front fender apron member 30 may be formed to have a cross section having a quadrangular box shape, and an opening portion. The front tip portion 34 of the front fender apron member 30 may be formed to have a wider area than the front tip portion 14 of the front side member 10.

Figure 3:
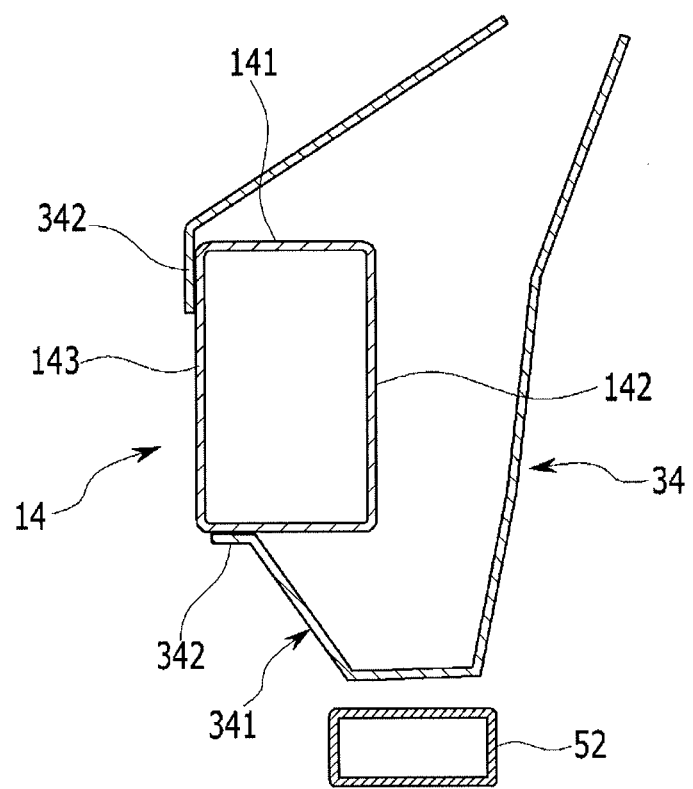
FIG. 3 is a cross-sectional view taken along line III-III of FIG. 1.

Referring to FIGS. 1 to 3, the front tip portion 34 of the front fender apron member 30 may include an enlarged portion 341 that is enlarged downward from the front tip portion 14 of the front side member 10 in the height direction of the vehicle. The enlarged portion 341 may constitute a part of the front tip portion 34.

A front tip portion 52 of a sub frame 50 in the length direction of the vehicle, which mainly serves to mount and support a suspension system and the like, may be directly fastened to the enlarged portion 341.

Accordingly, the front tip portion 34 of the front fender apron member 30 receives external impact and load, which are transferred to the vehicle body from wheels through the suspension system and the sub frame 50 sequentially when the vehicle travels, and effectively transmits and disperses the external impact and load to other parts in the vehicle body through the front side member 10 and the like, thereby improving ride comfort, driving stability, and the like of the vehicle.

In addition, the front tip portion 52 of the sub frame 50 may be directly fastened to the front tip portion 34 of the front fender apron member 30 without interposing a separate mounting bracket or the like, thereby reducing the number of components and a weight of the vehicle.

The front tip portion 34 of the front fender apron member 30 may be integrally coupled to the front tip portion 14 of the front side member 10.

Enlarged flanges 342 may be provided on the front tip portion 34 of the front fender apron member 30 so as to be coupled to the front tip portion 14 of the front side member 10.

The enlarged flanges 342 may be formed to be coupled to at least three surfaces of the front tip portion 14 of the front side member 10. That is, the enlarged flange 342 may be formed to be coupled to the front tip portion 14 of the front side member 10 in a state in which the enlarged flange 342 is in surface contact with an upper surface 141 of the front tip portion 14 of the front side member 10 in the height direction of the vehicle, and an outer surface 142 and an inner surface 143 thereof in the width direction of the vehicle.

The front tip portion 14 of the front side member 10 may be integrally coupled to the front tip portion 34 of the front fender apron member 30 through at least three enlarged flanges 342 in a state in which the front tip portion 14 of the front side member 10 is positioned above the front tip portion 34 of the front fender apron member 30 in the height direction of the vehicle.

As described above, since the front tip portion 34 of the front fender apron member 30 is coupled to the front tip portion 14 of the front side member 10 through at least three enlarged flanges 342, rigidity of connection between the front fender apron member 30 and the front side member 10 is improved, and as a result, at the time of a frontal collision accident of the vehicle, impact energy is simultaneously and effectively distributed to the front fender apron member 30 and the front side member 10, thereby properly coping with impact energy.

For convenience in explanation and accurate definition in the appended claims, the terms "front" or "rear", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure comprising:
   front side members which are formed to be extended in a length direction of a vehicle, are disposed at both left and right sides in a width direction of the vehicle, respectively, and each includes a front tip portion that is positioned at a front side in the length direction of the vehicle; and
   front fender apron members each of which is provided with a front tip portion that is aligned with the front tip portion of a respective front side member in the length direction of the vehicle to be coupled to the front tip portion of the respective front side member, and formed to be extended in the length direction of the vehicle,
   wherein the front tip portion of the respective front side member is positioned above the front tip portion of the corresponding front fender apron member in a height direction of the vehicle.

2. The front vehicle body reinforcing structure of claim 1, wherein:
   a cross-sectional area of the front tip portion of the respective front side member is smaller than a cross-sectional area of the front tip portion of the corresponding front fender apron member.

3. The front vehicle body reinforcing structure of claim 1, further comprising:
   a sub frame which mounts and supports a suspension system, and has a front tip portion that is positioned at the front side in the length direction of the vehicle,
   wherein the front tip portion of the corresponding front fender apron member includes an enlarged portion that is enlarged downward in the height direction of the vehicle to be directly fastened to the front tip portion of the sub frame.

4. The front vehicle body reinforcing structure of claim 3, wherein:
the front tip portion and the enlarged portion of the corresponding front fender apron member are formed to have a cross section having a quadrangular box shape.

5. The front vehicle body reinforcing structure of claim 1, wherein:
the front tip portion of the corresponding front fender apron member is provided with an enlarged flange or flanges to be coupled to the front tip portion of the respective front side member in a state in which the front tip portion of the corresponding front fender apron member is in surface contact with at least three surfaces of the front tip portion of the respective front side member.

6. The front vehicle body reinforcing structure of claim 5, wherein:
the front tip portion of the respective front side member is formed in a quadrangular box shape that is provided with an upper surface and a lower surface in the height direction of the vehicle, and an outer surface and an inner surface in the width direction of the vehicle, and
the flange or flanges of the front tip portion of the corresponding front fender apron member are coupled to the outer surface, the inner surface, and the upper surface of the front tip portion of the respective front side member, respectively.

7. The front vehicle body reinforcing structure of claim 1, further comprising:
a dash panel which separates an engine room and a passenger room,
wherein one or each of the front side members includes an enlarged portion that is positioned at a rear side in the length direction of the vehicle, and enlarged outward in the width direction of the vehicle to be coupled to the dash panel.

8. The front vehicle body reinforcing structure of claim 1, wherein:
one or each of the front fender apron members further includes a rear tip portion that is formed to be positioned at a rear side in the length direction of the vehicle, and coupled to a front pillar.

9. The front vehicle body reinforcing structure of claim 8, wherein:
the rear tip portion of the one or each of the front fender apron members is formed to be disposed above the front tip portion of the one or each of the front fender apron members in the height direction of the vehicle.

10. A front vehicle body reinforcing structure comprising:
front side members which are formed to be extended in a length direction of a vehicle, are disposed at both left and right sides in a width direction of the vehicle, respectively, and each includes a front tip portion that is positioned at a front side in the length direction of the vehicle; and
front fender apron members each of which is provided with a front tip portion that is aligned with the front tip portion of a respective front side member in the length direction of the vehicle to be coupled to the front tip portion of the respective front side member, and formed to be extended in the length direction of the vehicle,
wherein the front tip portion of the corresponding front fender apron member is provided with an enlarged flange or flanges to be coupled to the front tip portion of the respective front side member in a state in which the front tip portion of the corresponding front fender apron member is in surface contact with at least three surfaces of the front tip portion of the respective front side member.

11. The front vehicle body reinforcing structure of claim 10, wherein:
the front tip portion of the respective front side member is formed in a quadrangular box shape that is provided with an upper surface and a lower surface in the height direction of the vehicle, and an outer surface and an inner surface in the width direction of the vehicle, and
the flange or flanges of the front tip portion of the corresponding front fender apron member are coupled to the outer surface, the inner surface, and the upper surface of the front tip portion of the respective front side member, respectively.

* * * * *